United States Patent
Garcia Soto et al.

(10) Patent No.: US 9,634,568 B2
(45) Date of Patent: Apr. 25, 2017

(54) DEVICE FOR CONTROLLING AND BALANCING CURRENTS FOR DC/DC CONVERTERS

(71) Applicant: Alstom Technology Ltd, Baden (CH)

(72) Inventors: Guillermo Garcia Soto, Massy (FR); Olivier Tarrade, Paris (FR)

(73) Assignee: ALSTOM TECHNOLOGY LTD, Baden (CH)

( * ) Notice: Subject to any disclaimer, the term of this patent is extended or adjusted under 35 U.S.C. 154(b) by 77 days.

(21) Appl. No.: 14/770,626

(22) PCT Filed: Feb. 25, 2014

(86) PCT No.: PCT/EP2014/053647
§ 371 (c)(1),
(2) Date: Aug. 26, 2015

(87) PCT Pub. No.: WO2014/131766
PCT Pub. Date: Sep. 4, 2014

(65) Prior Publication Data
US 2016/0013721 A1    Jan. 14, 2016

(30) Foreign Application Priority Data

Feb. 28, 2013    (FR) ...................................... 13 51802

(51) Int. Cl.
*H02M 3/158*    (2006.01)
*H02M 1/14*    (2006.01)
*H02M 1/00*    (2006.01)

(52) U.S. Cl.
CPC .............. *H02M 3/158* (2013.01); *H02M 1/14* (2013.01); *H02M 3/1584* (2013.01); *H02M 2001/0009* (2013.01); *H02M 2003/1586* (2013.01)

(58) Field of Classification Search
CPC ....... H02M 2003/1586; H02M 3/1584; H02M 3/158
See application file for complete search history.

(56) References Cited

U.S. PATENT DOCUMENTS 6,278,263 B1 *   8/2001   Walters ............... H02M 3/1584
                                                  323/272
2002/0144163 A1   10/2002  Goodfellow
(Continued)

FOREIGN PATENT DOCUMENTS

CN          102609066 A      7/2012

OTHER PUBLICATIONS

Pal Andreassen et al., "Digital Control Techniques for Current Mode Control of Interleaved Quasi Square Wave Converter" Power Electronics Specialists Conference, Jan. 1, 2005, pp. 273-279.
(Continued)

*Primary Examiner* — Harry Behm
(74) *Attorney, Agent, or Firm* — Pearne & Gordon, LLP

(57) ABSTRACT

The invention provides a control device for regulating and balancing currents, for DC/DC converters, between first and second voltage sources, the device comprising: n converters (C1, C2, . . . Cn) that are connected in parallel to the first voltage source (11); n inductors (L1, L2, . . . Ln) that have their outlets connected to the second voltage source (R) via n connections; n current sensors (22) that are arranged on respective ones of the connections; and a single regulator system that has its inputs connected to respective ones of the n current sensors (22), and its output connected to the n converters (C1, C2, . . . Cn).

1 Claim, 4 Drawing Sheets

(56) References Cited

U.S. PATENT DOCUMENTS

| | | | |
|---|---|---|---|
| 2003/0102849 A1* | 6/2003 | Schiff | H02M 3/1584 323/222 |
| 2003/0218893 A1* | 11/2003 | Tai | H02M 3/1584 363/65 |
| 2011/0043173 A1* | 2/2011 | Blaumeiser | H02M 3/1584 323/272 |
| 2012/0188805 A1 | 7/2012 | Tong | |

OTHER PUBLICATIONS

Wenkang Huang, Institute of Electrical and Electronics Engineers,"A New Control for Multi-phase Buck Converter with Fast Transient Response" Annual IEEE Applied Power Electronics Conference and Exposition, vol. 1, Mar. 4, 2001, pp. 910-914.

Search Report issued in French Patent Application No. FR 13 51802 dated Nov. 11, 2013.

International Search Report issued in Application No. PCT/EP2014/053647 dated May 26, 2014.

Written Opinion issued in Application No. PCT/EP2014/053647 dated May 26, 2014.

* cited by examiner

DEVICE FOR CONTROLLING AND BALANCING CURRENTS FOR DC/DC CONVERTERS

TECHNICAL FIELD

The invention relates to a control device for regulating and balancing currents for DC/DC converters, in particular in the field of energy storage, e.g. for charging and discharging batteries.

STATE OF THE PRIOR ART

FIG. 1 shows a prior-art high-power DC/DC converter including n arms each made up of two semi-conductor components arranged in series. Each semi-conductor component comprises a transistor Ti, e.g. an insulated gate bipolar transistor (IGBT) in parallel with a diode Di. The converter is arranged between a storage unit 11, e.g. a battery, and a load voltage source R, the middle point of each arm, corresponding to a respective phase i of the current, being connected to the load voltage source R by means of a respective smoothing inductor L1, L2, ... Ln. The converter also includes a regulator system that is made up of respective proportional integral derivative blocks PIDi and respective pulse width modulation blocks PWMi for each current phase i, the current Ii* representing a current setpoint.

A regulator system PIDi+PWMi is described below.

PID Block

A PID block, shown in FIG. 2, serves to regulate a value, i.e. to constrain a system to follow a given setpoint by providing closed-loop feedback. The value to be regulated is thus monitored and compared to the given setpoint, and the difference between them is measured. An output signal is then generated that is proportional to said difference. But the proportional gain is not sufficient, since the setpoint value may be overshot because of the inertia of the system. Thus, in order to predict the behavior of the system, the output value is integrated. If the setpoint value is overshot, the integrator constrains the system to adapt the output. Furthermore, since this integral gain is not sufficient, the slope (derivative) is monitored so as to check that the setpoint is not overshot, and if it is, a correction is made.

All of these regulation techniques constitute a PID corrector. Thus, the transfer function of a parallel PID corrector, as a Laplace transform, is the sum of three actions:

$$C(p) = G + \frac{1}{\tau i} \cdot \frac{1}{p} + Td \cdot p$$

PWM Block

A PWM block uses pulse width modulation that consists in introducing additional switching at frequency that is higher than the fundamental frequency, transforming a voltage into a series of square waves of fixed amplitude and of varying width. A PWM command is obtained by comparing a low-frequency modulating wave 20 to a high-frequency carrier wave 21 of triangular waveform, as shown in FIG. 3. The pulses S as generated in this way serve as commands for switching transistors Ti.

Using a regulator system for each phase of current to be regulated requires the regulator system to be replicated as many times as necessary, and this leads to a large consumption of resources. For an embodiment with field programmable gate array (FPGA) circuits, this leads to a greater number of logic gates.

To solve this technical problem, the invention proposes a control device for regulating and balancing currents for n DC/DC converters using a single regulator system, with balanced currents, as shown in FIG. 4, so that: I=I1+I2+ ... In and I1=I2= ... In

SUMMARY OF THE INVENTION

The invention provides a control device for regulating and balancing currents, for DC/DC converters, between first and second voltage sources, the device comprising:
- n converters that are connected in parallel to the first voltage source;
- n inductors that have their outlets connected to the second voltage source via n connections; and
- n current sensors that are arranged on respective ones of the connections;
- a single regulator system that has its inputs connected to respective ones of the n current sensors, and its output connected to the n converters;

characterized in that the regulator system comprises:
- a summing circuit for summing the currents output from the current sensors;
- a PID block that receives the current output from the summing circuit;
- a 1/n divider that receives the current output from the summing circuit and that delivers an average current;
- n comparators for comparing the currents measured by the current sensors with the average current;
- n proportional gain elements that are arranged at the outputs from the comparators;
- n summing circuits for summing the outputs from the n proportional gain elements with the output from the PID block; and
- a PWM block that receives the outputs from the n summing circuits and that delivers n interleaved channels.

The device of the invention presents the following advantages:
- a regulated average current is used from the n arms;
- the currents from the n arms are balanced;
- a single regulator system is used;
- rapid balancing is obtained as a result of the contribution from the proportional correction;
- current sensors are used that are calibrated for $(1/n)^{th}$ of the average current; and
- execution times are short and FPGA resources are minimal.

DETAILED DESCRIPTION OF PARTICULAR EMBODIMENTS

In the description below, elements that are analogous to one another are shown with the same references.

Figure 1:
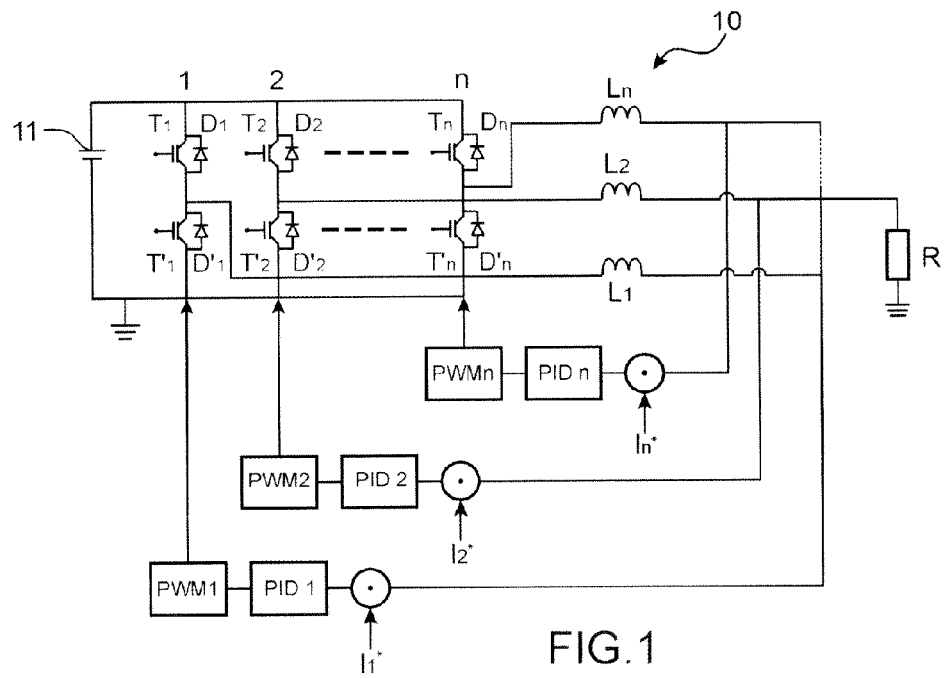
FIG. 1 shows a prior-art device.
Figure 2:
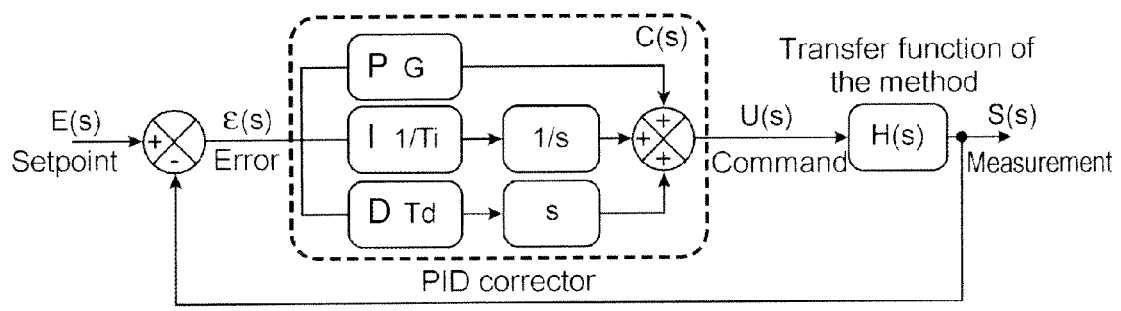
FIG. 2 shows a PID block.
Figure 3:
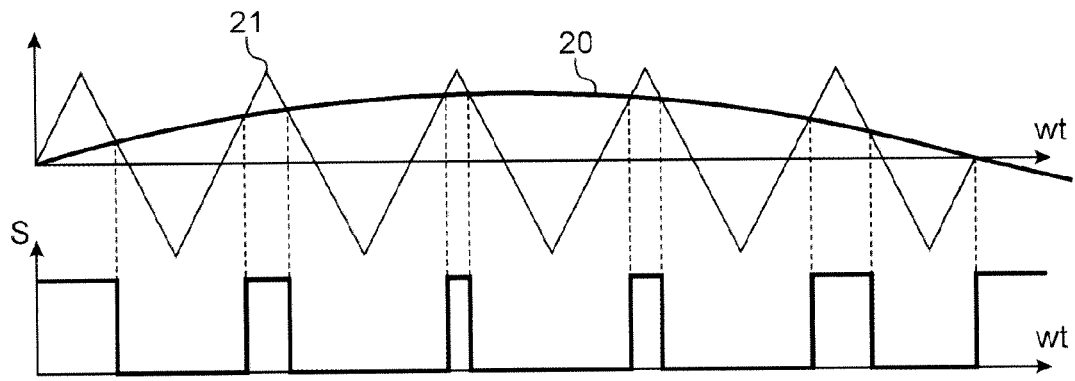
FIG. 3 shows the operation of a PWM block.
Figure 4:
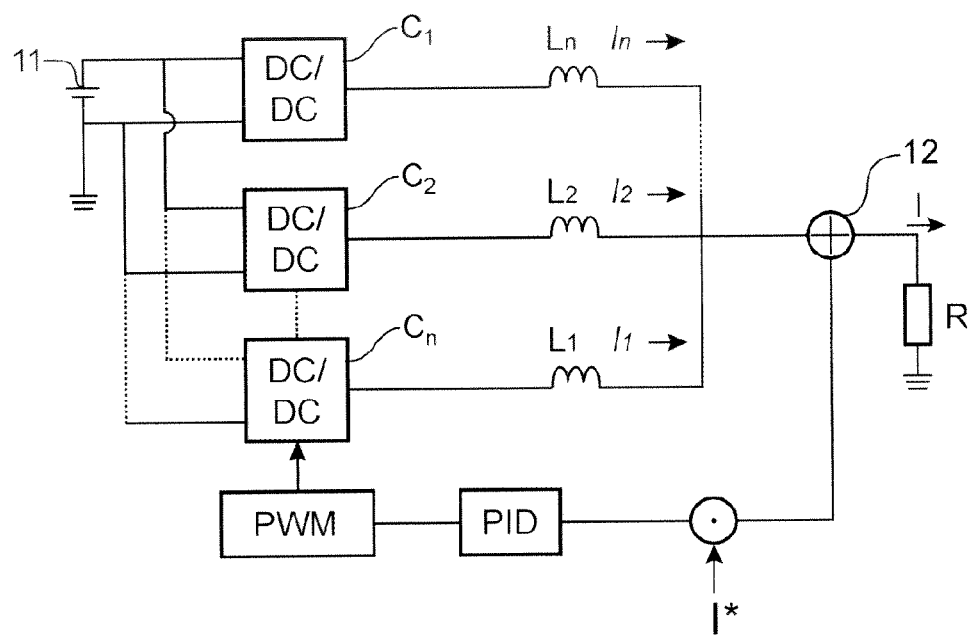
FIGS. 4 and 5 show characteristics of the device of the invention.
Figure 5:
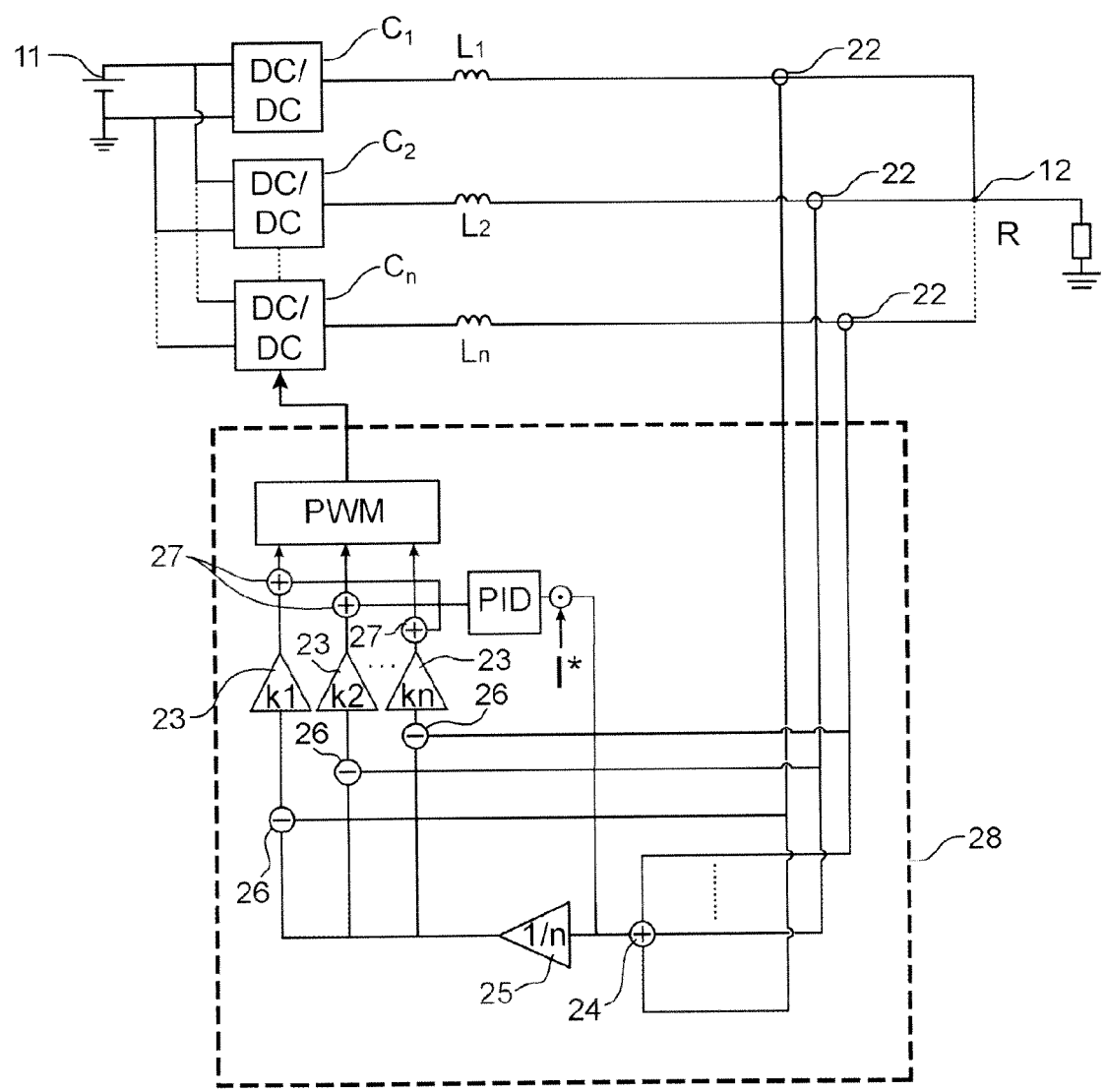

The control device of the invention for regulating and balancing currents for DC/DC converters, as shown in FIGS. 4 and 5, comprises:
- n boost/buck converters C1, C2, ... Cn that have their inlets connected to a voltage source 11 that delivers or absorbs energy;
- n inductors L1, L2, ... Ln that have their inlets connected to the outlets of respective ones of the converters C1, C2, ... Cn, and that have their outlets connected via n connections and a summing circuit 12, to a load voltage source R that delivers or absorbs energy;
- n current sensors 22 that are arranged on respective ones of the connections; and
- a regulator system 28 comprising:
  - a summing circuit 24 for summing the currents output from the current sensors 22;
  - a PID block arranged at the output from the summing circuit;
  - a 1/n divider 25 that receives the current output from the summing circuit and that delivers an average current;
  - n comparators 26 for comparing the currents measured by the current sensors 22 with the average current;
  - n proportional gain elements 23 that are arranged at the outputs from the n comparators;
  - n summing circuits 27 for summing the outputs from the n proportional gain elements with the output from the PID block; and
  - a PWM block that receives the outputs from the n summing circuits and that delivers n interleaved channels.

In the device of the invention, the average value of the sum of the outlet currents from the DC/DC conversion device is regulated, and this requires only one regulator system. The currents of the n converters of the DC/DC conversion device are balanced by measuring the outlet currents and by comparing them to the average value (divided by n). Thus, the resulting difference is added, via a proportional gain, to the command for regulating the average value.

The device makes it possible to use only one regulator system and to ensure that the currents are balanced.

Figure 6:
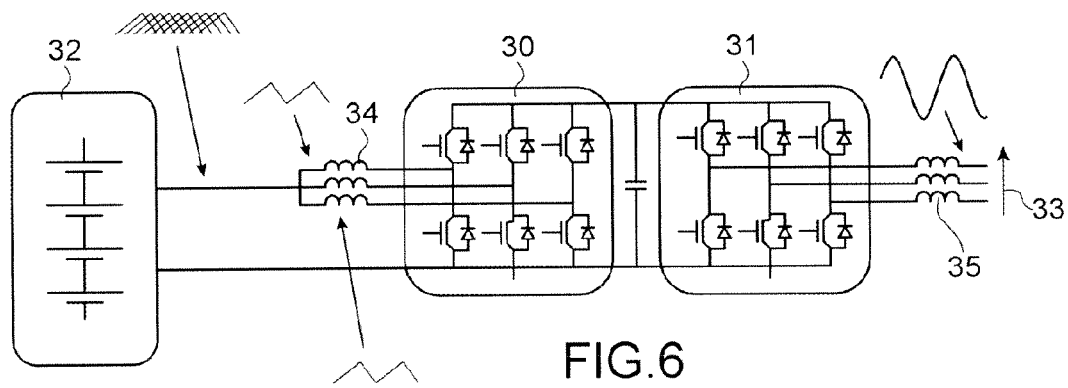
FIGS. 6 and 6A show an embodiment of the device of the invention.
Figure 6A:
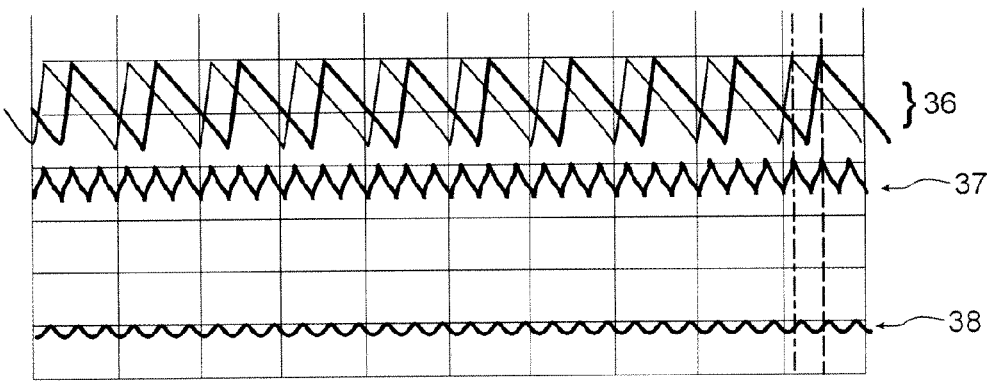

FIGS. 6 and 6A show a solution tested on a 500 kilowatt (kW) energy storage demonstrator with Li-ion batteries and NaS batteries. The structure used corresponds to a basic structure comprising a DC/DC converter 30 and a DC/AC converter 31 situated between the battery 32 and the AC network 33, three-phase windings 34 and 35 being arranged at the inlets and at the outlets, capacitance being arranged between a DC/DC converter and a DC/AC converter. The curves 36 show the currents of two of the three DC/DC converters, and the curve 37 shows the total current.

The invention claimed is:

1. A control device for regulating and balancing currents, for DC/DC converters, between first and second voltage sources, the device comprising:
   - n converters that are connected in parallel to the first voltage source;
   - n inductors that have their outlets connected to the second voltage source via n connections; and
   - n current sensors that are arranged on respective ones of the connections;
   - a single regulator system that has its inputs connected to respective ones of the n current sensors, and its output connected to the n converters, wherein the regulator system comprises:
     - a summing circuit for summing the currents output from the current sensors;
     - a PID block that receives the current output from the summing circuit;
     - a 1/n divider that receives the current output from the summing circuit and that delivers an average current;
     - n comparators for comparing the currents measured by the current sensors with the average current;
     - n proportional gain elements that are arranged at the outputs from the comparators;
     - n summing circuits for summing the outputs from the n proportional gain elements with the output from the PID block; and
     - a PWM block that receives the outputs from the n summing circuits and that delivers n interleaved channels.

* * * * *